Aug. 22, 1950   G. S. PETERSON   2,519,500
APPLE CORER AND CUTTER
Filed April 8, 1947

INVENTOR.
George S. Peterson
BY *Victor J. Evans & Co.*
ATTORNEYS

Patented Aug. 22, 1950

2,519,500

UNITED STATES PATENT OFFICE 2,519,500

APPLE CORER AND CUTTER

George S. Peterson, Sturgeon Bay, Wis.

Application April 8, 1947, Serial No. 740,019

1 Claim. (Cl. 30—302)

This invention relates to a fruit cutting and coring device and more particularly to such a device adapted primarily for the coring of apples, and the simultaneous cutting of the apples into a plurality of segments.

A primary object of this invention is the provision of an improved device of this nature characterized by a plurality of radially extending cutting blades having a central aperture therein provided with a substantially circular coring blade, the arrangement being such that a single downward stroke of the device simultaneously cores and cuts the fruit into a plurality of segments.

Still another object of the invention is the provision of a guide plate positioned within the central aperture of the device adapted to direct the core removed from the apple outwardly of the device during the coring operation, thus obviating the necessity of subsequent removal of the core therefrom.

A further object of the device is the provision of an implement which may be readily cleaned, and provided with relatively few restricted places in which fruit or dirt or the like may lodge.

A still further and more specific object of the invention is the provision of a guide plate for the fruit core characterized by a relatively free upper end, and being of resilient construction, in such manner that the same may be readily deflected during the coring operation, and yet which will return to guiding position to remove the core from the center of the device.

Still another object of the invention is the provision of such corer and cutting implement which is sturdy and durable in construction, reliable and efficient in operation, and which may be readily manufactured with a minimum of effort and difficulty.

Other objects will in part be obvious and in part be pointed out as the description of the invention proceeds, and shown in the accompanying drawing wherein there is disclosed a preferred embodiment of this inventive concept.

In the drawings.

Similar reference characters refer to similar parts throughout the several views of the drawing.

Figure 1:
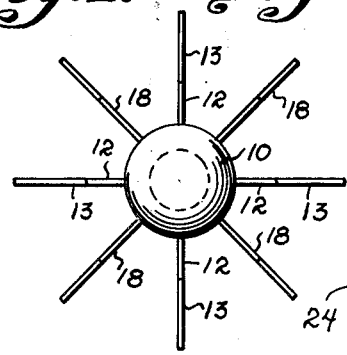
Figure 1 is a top plan view of one form of device embodying features of the instant invention.

Referring now to the drawings, the device includes a handle 10, of any desired conventional configuration, which may be made of any suitable material such as wood or the like, and which may be provided at its lower extremity with a cruciform slot, adapted to receive tangs or prongs 11, of a pair of blade members 12, disposed in substantially right angular relation to each other. The blade members 12 may be connected in any desired manner as by welding or the like. Each of the blade members 12 comprises a bifurcated portion depending from the associated tang, and terminating in outwardly flared blade members 13, provided at their lower surfaces with cutting edges 14. The space 15 between the bifurcations of each blade is relatively wide, and tapers downwardly away from the handle, being of a sufficient space to readily accommodate the core of an apple or the like.

The lower extremities of the bifurcated portions of blade 12 are connected by a ring like blade 16, provided at its lower extremity with a cutting edge 17, of circular configuration, adapted for the coring of fruit, such as an apple or the like. If desired the cutting edges 14, which alone would serve to cut an apple or the like in quarters, may be implemented by additional blades 18 provided with lower cutting edges 19, suitably secured to the ring 16 and equidistantly spaced between the cutting edges 14, in order to provide means for cutting the apple into eighths simultaneously with the coring thereof. Obviously if desired a larger or lesser number of blades may be employed.

Figure 6:
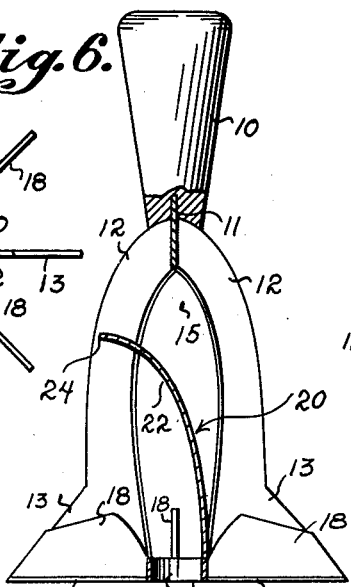
Figure 6 is a partial sectional view taken substantially along the lines 6—6 of Figure 2 as viewed in the direction indicated by the arrows.
Figure 2:
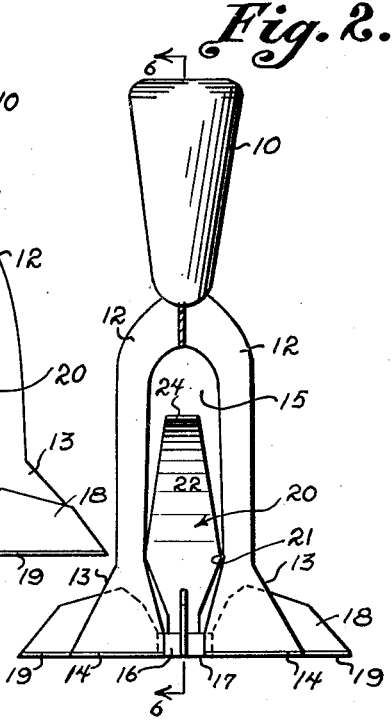
Figure 2 is a side elevational view of the construction shown in Figure 1, certain concealed portions thereof being indicated in dotted lines, and certain portions being shown in cross-section.
Figure 3:
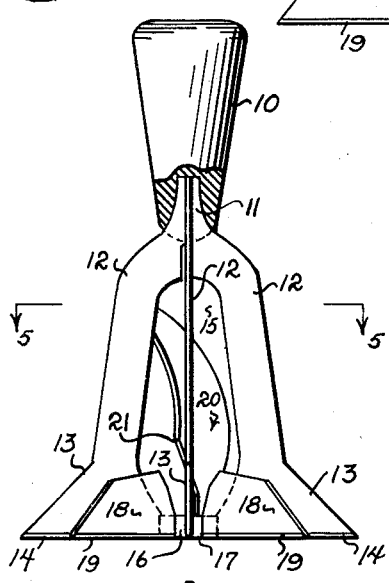
Figure 3 is a view similar to Figure 2, but taken at substantially right angles thereto, parts thereof being broken away to show certain internal details of construction.
Figure 5:
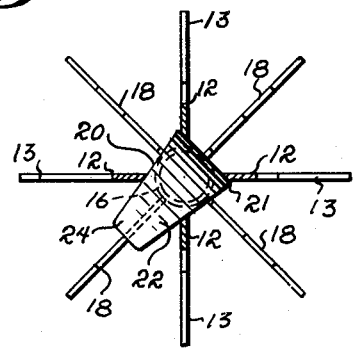
Figure 5 is a sectional view taken substantially along the line 5—5 of Figure 3 as viewed in the direction indicated by the arrows.
Figure 4:
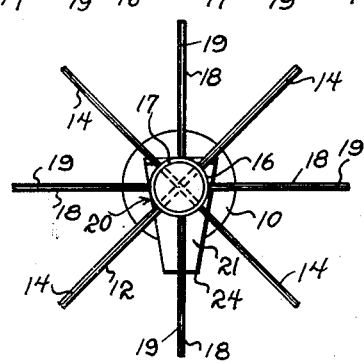
Figure 4 is a bottom plan view of the device, certain concealed parts thereof being indicated in dotted lines.

Associated with the ring 16, in any desired manner, is a core deflecting member 20. The member 20 may be formed integrally with the ring 16 from a single stamping, or may be suitably attached thereto as by soldering, welding, or the like. The member 20 includes a relatively wide portion 21, corresponding substantially to the maximum width of the central aperture 15 of the device, and a tapered section 22, of arcuate configuration, as best shown in Figures 3 and 6, terminating in a free extremity 24 between two of the blades 12 adjacent the upper portion thereof. It will be readily understood that the arcuate configuration of the member 20 serves to deflect the core removed from the apple or the like outwardly of the central recess 15 thus obviating the necessity of subsequently removing the core from the device after use. It will also be seen that the relative resiliency of the device, occasioned by the free end 24 thereof will permit relatively slight play thereof, which is advantageous in effectually coring an apple.

From the foregoing it will now be seen that there is herein provided a fruit coring device which accomplishes all the objects of this invention, and others, including many advantages of great practical utility and commercial importance. It will also be seen that the device of the instant invention at a single stroke will core and sectionalize an apple or other fruit with a minimum of difficulty and effort.

As various embodiments may be made of this inventive concept, and as various modifications may be made in the embodiment here and before shown and described, it is to be understood that all matter herein is to be interpreted merely as illustrative and not in a limiting sense.

I claim:

In a device of the character described, a handle, a plurality of substantially U-shaped blade members having spaced leg portions extending from a common bight portion, a prong attached to each bight portion and secured to said handle, said blade members being angularly disposed about the longitudinal axis of said handle and with said leg portions extending radially of said axis, a ring between the extremities of said leg portions and connected thereto, cutting edges on the lower extremities of said leg portions, a peripheral cutting edge on the lower extremity of said ring, a core deflector secured to said ring between said leg portions, supplemental cutting blades secured to said ring between said leg portions, said deflector being of arcuate configuration having its upper end deflected outwardly of the space between said leg portions and being free thereof.

GEORGE S. PETERSON.

REFERENCES CITED

The following references are of record in the file of this patent:

UNITED STATES PATENTS

| Number | Name | Date |
|---|---|---|
| 123,540 | Williams | Feb. 6, 1872 |
| 498,528 | Winckler | May 30, 1893 |
| 975,410 | Fullmer et al. | Nov. 15, 1910 |

FOREIGN PATENTS

| Number | Country | Date |
|---|---|---|
| 288,014 | Great Britain | Apr. 5, 1928 |